Patented Nov. 3, 1931

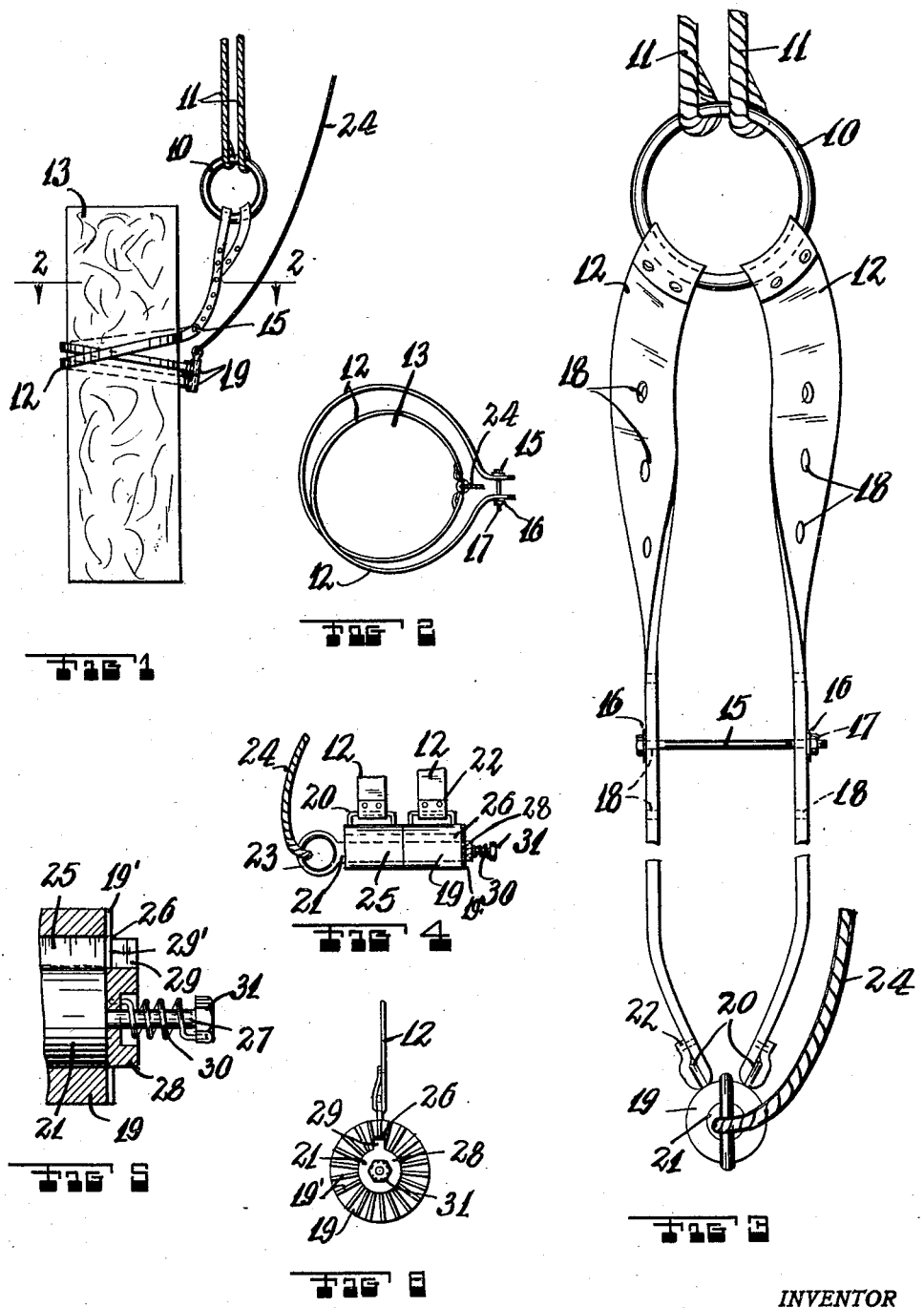

1,829,860

UNITED STATES PATENT OFFICE

WILLIAM HERRMANN, OF WEST ALBANY, NEW YORK

SLING

Application filed September 4, 1930. Serial No. 479,643.

This invention relates to new and useful improvements in a sling.

The invention has for an object the provision of a device of the class mentioned which is of simple durable construction, dependable in use and efficient in action, and which can be manufactured and sold at a reasonable cost.

The invention proposes a sling consisting mainly of a pair of flexible straps for winding around an object in opposite directions, means for clamping said straps together so as to firmly hold the object regardless of its size, releasable means on the straps to hold said straps encircled around said object, and a rope to operate said releasable means from the point of hoisting for disengaging the object.

The invention also proposes a means to prevent the operation of the releasable means upon the first pull of the rope.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:—

Fig. 1 is an elevational view of a device constructed according to this invention supporting an object.

Fig. 2 is a sectional view taken on the line 2—2 of Fig. 1.

Fig. 3 is the device constructed according to this invention in an outstretched position.

Fig. 4 is a side view taken on the line 4—4 of Fig. 3.

Fig. 5 is an enlarged detailed fragmentary sectional view of a portion of Fig. 4.

Fig. 6 is an end view of Fig. 4.

The sling comprises a ring 10 for suspension by ropes 11, a pair of flexible straps 12 attached at one of their ends to the said ring 10 and for winding around an object 13 in opposite directions, a clamp connecting intermediate portions of the said straps 12 together at the junction where the straps leave the object, releasable means attached at the other ends of the straps 12 for holding the straps encircled around the object 13, and a rope 24 connected to the releasable means and for drawing to release the straps and allow the object to disengage.

The ring 10 is connected to the ropes 11 in any conventional manner such as tying, binding, etc. The straps 12 are made of web belting or leather belting so that they may be flexible in order that they may be wound around an object of any size or shape. A length of about six feet is preferable for ordinary purposes, but different lengths may be used for special cases.

The straps 12 are attached to the ring 10 by bending the ends of the straps around the ring forming loops and then riveting the ends of the straps to the strap portions adjacent to close the loops. This affords a loose connection between the ring and the straps and free motion results. The intermediate portions of the straps 12 are wound about an object and then clamped together at the point where they leave the object. The clamp comprises a bolt 15, washers 16 and a nut 17 threadedly engaged upon the bolt. A series of apertures 18 are formed in each strap 12. The bolt 15 is engaged through any pair of apertures 18, the washers 16 put on, and the nut 17 engaged. The pair of apertures used is determined by the size of the object 13.

The releasable means for holding the straps encircled around the object comprises two tubular members 19 with loops 20 formed on them, and a pin 21. The straps 12 are engaged upon these tubular members by passing their ends through the loops 20, bending the ends around to form loops and then closing the loops by means of rivets 22. A ring 23 is formed upon one end of the pin 21 for attachment to a rope 24 for drawing the pin out of the tubular members to separate the straps 12. Normally the pin 21 tends to remain within the tubular members because of the shear caused by the opposite pulls of the straps 12.

The means which is provided on the releasable means to prevent the operation of the releasable means upon the first pull of the rope 24 includes a key 25 on the pin 21 engageable in a key groove 26 formed in the tubular members 19 for preventing the pin 21 from revolving. A peg 27 preferably integral with the pin 21 projects from one of the pin's ends. A disc 28 is formed with a key 29 projecting from its periphery and is rotatively mounted on the peg 27. A coaxial spring 30 mounted on the peg 27 acts between the disc 28 and a head 31 on the end of the peg 27, for normally urging the disc 28 against the end of the pin 21 and for engaging radial teeth 29' on the key 29 with radial teeth 19' on one end of one of the tubular members 19 for restraining relative turning of these parts and for normally urging turning of the disc 28 to a position in which the key 29 is in line with the key groove 26.

In operation of this means, the disc 28 is manually turned, taking key 29 off line with the key groove 26 and then fixing it in that position by allowing the radial teeth to engage. To operate the releasable means the rope 24 is pulled. The pin 21 slides within the tubular members 19 until the nut 31 engages against the disc 28. During this motion the spring 30 is compressed. When the rope 24 is released the spring 30 immediately expands and quickly draws the pin 21 back. As the pin 21 comes back, it overrides its normal position and hits the disc 28 moving it outward. At this moment the radial teeth on the pin 21 and the disc 28 are disengaged and the spring 30 begins to revolve the disc 28 into a position in which the key 29 will be in line with the key groove 26. But, before this position is reached, the spring 30 presses the disc 28 against the pin 21 and engages the radial teeth 19' and 29' preventing any further motion. Upon successive pulls on the rope 24, the key 29 will slowly revolve until it is finally in line with the key groove 26, when it is possible to pull the key out of the tubular members 19 and disengage the straps 12. The advantage of this means is that an accidental pull upon the rope 24 will not release the object.

In operation of the device, the straps 12 are wound around an object in opposite directions, the clamp bolt 15 inserted in the proper apertures 18 to secure the object in a firm manner. The object may then be raised or lowered by means of ropes 11. When it is desired to release the object 13, pulling the rope 24 will disengage the pin 21 and release the straps 12 disengaging the object from their grip.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A sling, comprising a ring for suspension by ropes or the like, a pair of flexible straps attached at one of their ends to the said ring for winding around an object in opposite directions, a clamp connecting intermediate portions of the said straps together at the junction where the straps leave the object, releasable means attached at the other end of the straps for holding the straps encircled around the object, and a rope connected to the rleasable means and for drawing to release the straps and allow the object to disengage, said clamp connecting the intermediate portions of the said straps together comprises a bolt engageable through a pair of a series of pairs of apertures formed in said straps, washers engageable on said bolt, and a nut threadedly engaged upon said bolt for drawing said straps taut.

2. A sling, comprising a ring for suspension by ropes or the like, a pair of flexible straps attached at one of their ends to the said ring for winding around an object in opposite directions, a clamp connecting intermediate portions of the said straps together at the junction where the straps leave the object, releasable means attached at the other end of the straps for holding the straps encircled around the object, and a rope connected to the releasable means and for drawing to release the straps and allow the object to disengage, said releasable means for holding the straps encircled about the object comprises tubular members attached to said straps, a pin engaging through said tubular members, and a ring formed on said pin for engagement by a rope.

3. A sling, comprising a ring for suspension by ropes or the like, a pair of flexible straps attached at one of their ends to the said ring for winding around an object in opposite directions, a clamp connecting intermediate portions of the said straps together at the junction where the straps leave the object, releasable means attached at the other end of the straps for holding the straps encircled around the object, a rope connected to the releasable means and for drawing to release the straps and allow the object to disengage, and means to prevent the operation of the releasable means upon the first pull of the rope.

4. A sling, comprising a ring for suspension by ropes or the like, a pair of flexible straps attached at one of their ends to the said ring for winding around an object in opposite directions, a clamp connecting intermediate portions of the said straps together at the junction where the straps leave the object, releasable means attached at the other end of the straps for holding the straps encircled around the object, a rope connected to the releasable means and for drawing to release the straps and allow the object to disengage, and means to prevent the operation of the releasable means upon the first pull of the rope, comprises tubular members formed with a key groove and attached to said straps, a pin engaging through said tubular members, a key formed on said pin engageable in said key groove, a peg projecting from one end of the said pin, a disc formed with radial teeth on its face engageable in radial teeth formed on said end of the pin, a key projecting from the periphery of said disc, a nut threadedly engaged upon said peg, and means for urging the said disc against said pin and for revolving said disc to bring said key in alignment with the key groove.

5. A sling, comprising a ring for suspension by ropes or the like, a pair of flexible straps attached at one of their ends to the said ring for winding around an object in opposite directions, a clamp connecting intermediate portions of the said straps together at the junction where the straps leave the object, releasable means attached at the other end of the straps for holding the straps encircled around the object, a rope connected to the releasable means and for drawing to release the straps and allow the object to disengage, and means to prevent the operation of the releasable means upon the first pull of the rope, comprises tubular members formed with a key groove and attached to said straps, a pin engaging through said tubular members, a key formed on said pin engageable in said key groove, a peg projecting from one end of the said pin, a disc formed with radial teeth on its face engageable in radial teeth formed on said end of the pin, a key projecting from the periphery of said disc, a nut threadedly engaged upon said peg, and a spring for urging the said disc against said pin and for revolving said disc to bring said key in alignment with the key groove.

In testimony whereof I have affixed my signature.

WILLIAM HERRMANN.